(12) United States Patent
Hoa et al.

(10) Patent No.: US 9,260,633 B2
(45) Date of Patent: Feb. 16, 2016

(54) ELECTRICALLY CONDUCTIVE ADHESIVES COMPRISING BUCKY PAPER AND AN ADHESIVE RESIN

(75) Inventors: Suong Van Hoa, Brossard (CA); Daniel Iosif Rosca, St-Hubert (CA)

(73) Assignee: CONCORDIA UNIVERSITY, Montreal (CA)

( * ) Notice: Subject to any disclaimer, the term of this patent is extended or adjusted under 35 U.S.C. 154(b) by 659 days.

(21) Appl. No.: 13/521,607

(22) PCT Filed: Jan. 12, 2011

(86) PCT No.: PCT/CA2011/050010
§ 371 (c)(1),
(2), (4) Date: Jul. 11, 2012

(87) PCT Pub. No.: WO2011/085493
PCT Pub. Date: Jul. 21, 2011

(65) Prior Publication Data
US 2012/0298927 A1    Nov. 29, 2012

Related U.S. Application Data

(60) Provisional application No. 61/294,219, filed on Jan. 12, 2010.

(51) Int. Cl.
*H01B 1/24*   (2006.01)
*B32B 7/14*   (2006.01)
(Continued)

(52) U.S. Cl.
CPC ............... *C09J 7/043* (2013.01); *B29C 65/48* (2013.01); *B29C 65/4855* (2013.01); *B32B 7/14* (2013.01);
(Continued)

(58) Field of Classification Search
CPC .... B29C 44/12; B29C 45/1657; B29C 65/00; B29C 65/48; B29C 65/4855; B29C 65/5064; B32B 7/00; B32B 7/12; B32B 7/14; H01B 1/24
USPC ........... 156/60, 62.6, 325, 327, 330; 264/239, 264/259, 261, 241; 252/502, 511
See application file for complete search history.

(56) References Cited

U.S. PATENT DOCUMENTS

2008/0057265 A1   3/2008   Liang et al.
2009/0155467 A1   6/2009   Wang et al.
(Continued)

FOREIGN PATENT DOCUMENTS

WO       2005017012 A1    2/2005
WO   WO 2010144009 A1 *  12/2010

OTHER PUBLICATIONS

Baur, J. & E. Silverman, "Challenges and Opportunities for Nanotechnology in Multi-functional Composite Structures", Materials and Manufacturing Directorate, Air Force Research Laboratory, Air Force Material Command, Wright-Patterson Air Force Base, OH 45433-7750, Nov. 2006.
(Continued)

*Primary Examiner* — Khanh Tuan Nguyen
*Assistant Examiner* — Haidung Nguyen
(74) *Attorney, Agent, or Firm* — Goudreau Gage Dubuc; Isabelle Pelletier

(57) ABSTRACT

An electrically conductive adhesive sheet for joining structural elements, the adhesive sheet comprising Bucky paper impregnated with an adhesive resin is provided. A method of forming an electrically conductive joint between structural elements and a process of making an electrically conductive adhesive sheet for joining structural elements are also provided.

9 Claims, 2 Drawing Sheets

(51) Int. Cl.
  B29C 65/48    (2006.01)
  C09J 7/04     (2006.01)
  B29C 65/50    (2006.01)
  B32B 7/12     (2006.01)

(52) U.S. Cl.
  CPC .............. *H01B 1/24* (2013.01); *B29C 65/5064* (2013.01); *B32B 7/12* (2013.01); *C09J 2201/602* (2013.01); *C09J 2400/263* (2013.01); *C09J 2463/00* (2013.01); *C09J 2475/00* (2013.01); *Y10T 156/1062* (2015.01)

(56) References Cited

U.S. PATENT DOCUMENTS

2009/0280324 A1   11/2009   Liang et al.
2010/0188833 A1   7/2010    Liang et al.

OTHER PUBLICATIONS

Gibson, T. et al., "Formulation and Evaluation of Carbon Nanofiber-based Conductive Adhesives", Proceeding of SAMPE 2005—Long Beach, CA May 1-5, 2005.
Gonnet, P. et al., "Thermal conductivity of magnetically aligned carbon nanotube buckypapers and nanocornposites", Current Applied Physics 6:119-122 (2006).
Lopes, P.E. et al., "High CNT content composites with CNT Buckypaper and epoxy resin matrix: Impregnation behaviour composite production and characterization", Composite Structures 92:1291-1298 (2010).
Wang, S. "Functionalization of carbon nanotubes: Characterization, modeling and composite application", Ph.D. Thesis. The Florida State University, College of Engineering, 2006.
Wu, Z. et al., "Study of processing variables on the electrical resistivity of conductive adhesives", International Journal of Adhesion & Adhesives 29:488-494 (2009).
International Search Report for PCT/CA2011/050010 dated Apr. 6, 2011.

* cited by examiner

ELECTRICALLY CONDUCTIVE ADHESIVES COMPRISING BUCKY PAPER AND AN ADHESIVE RESIN

CROSS REFERENCE TO RELATED APPLICATIONS

This application is a National Entry Application of PCT application no PCT/CA2011/050010 filed on Jan. 12, 2011 and published in English under PCT Article 21(2), which itself claims benefit of U.S. provisional application Ser. No. 61/294,219 filed on Jan. 12, 2010. All the above documents are incorporated herein in its entirety by reference.

FIELD OF THE INVENTION

The present invention relates to electrically conductive adhesives. More specifically, the present invention is concerned with adhesives for joining structural elements, for example in applications where electrical conductivity through the joint is desired.

BACKGROUND OF THE INVENTION

The use of adhesives is required in many engineering applications in which the bonding of structural elements is necessary. Bonding is a joining technique that is light weight and does not require making holes as other joining techniques such as for example bolting.

In some applications, it is necessary that the joint between structural elements is not only of good shear strength but is also a good electrical conductor. These applications include the following:

In helicopter applications, one may need to run electricity from the pilot control board (usually located inside the cabin) to the engine (located above the cabin). Electrical circuits sometimes run across joints. When bonded joints are used instead of bolted joints, such bonded joints should be electrically conductive.
 In Electro Magnetic Interference Shielding (EMI shielding) applications, it is necessary to ensure that there are no leaks of the electromagnetic field across the shield. If joints are present in the shield, these must either be tight or electrically conductive. Bolted joints may or may not be effective for such applications. It should be noted that when non-electrically conductive bonded joints are used, leaking may occur.
 For lightning protection purposes, it is necessary to provide conductive shielding. Joints that may be present in such a shield should be conductive to dissipate away electrons.

Other applications in which electrically conductive joints are used are automotive components, windmills, etc.

Adhesives for the above applications are usually made of polymers such as epoxies and polyurethanes, which are not electrically conductive. Efforts have been attempted to increase the conductivity of these adhesives by adding carbon black. However, large amounts of carbon black are required which adds much weight to the adhesive and decreases its shear strength.

Carbon nanotubes are carbonaceous materials, which have received a great deal of interest since the early 1990s. Adhesives containing carbon nanotubes mixed with adhesive resins have been reported.

Bucky paper is a network of carbon nanotubes which can be handled as conventional fiber mats. Bucky paper composites for various applications (such as EMI shielding) including composites made of Bucky papers impregnated with resins have been described.

The present description refers to a number of documents, the content of which is herein incorporated by reference in their entirety.

SUMMARY OF THE INVENTION

There is provided:

1. An electrically conductive adhesive sheet for joining structural elements, the adhesive sheet comprising Bucky paper impregnated with an adhesive resin.
2. The adhesive sheet of item 1, wherein the Bucky paper is impregnated with the adhesive resin and with a curing agent.
3. The adhesive sheet of item 1 or 2 being disposed onto a peel-away film.
4. The adhesive sheet of item 3 being covered by another peel-away film.
5. The adhesive sheet of any one of items 1 to 4, wherein the adhesive resin is a thermoset resin, an epoxy resin or a polyurethane resin.
6. The adhesive sheet of item 5, wherein the adhesive resin is an uncured or a partially cured thermoset resin.
7. The adhesive sheet of any one of items 1 to 6 being in the form of one or more strips.
8. The adhesive sheet of item 7, wherein the strips are parallel to each other or form a checkered pattern or a diamond checkered pattern.
9. The adhesive sheet of any one of item 1 to 8, being of a size covering about half of an overlap area between structural elements to be joined with the adhesive.
10. The adhesive sheet of any one of items 1 to 9, being in the form of one or more strips, the strips being parallel to each other and oriented generally normal to a load direction.
11. A method of forming an electrically conductive joint between structural elements, the method comprising:
 a. providing an electrically conductive adhesive sheet comprising Bucky paper impregnated with an adhesive resin,
 b. at least partially covering an overlap area between the structural elements with the conductive adhesive sheet, and
 c. pressing the structural elements together.
12. The method of item 11 further comprising the step of curing the adhesive resin.
13. The method of item 11 or 12, wherein one or more peel-away films are removed from the adhesive sheet prior to and/or after the covering step, but before the pressing step.
14. The method of any one of items 11 to 13, wherein, in the covering step, the adhesive sheet is applied so that it covers about half of the overlap area.
15. The method of any one of items 11 to 14, wherein the adhesive sheet is precut into one or more strips or wherein the method comprises the step of cutting the adhesive sheet into one or more strips before the covering step.
16. The method of item 15, wherein the strips are pre-aligned parallel to each other or in a checkered or a diamond-checkered pattern or wherein the covering step comprises aligning the strips parallel to each other or in a checkered or a diamond-checkered pattern.
17. The method of item 15, wherein the covering step comprises aligning the strips parallel to each other and orienting the strips generally normal to a load direction.
18. The method of any one of items 11 to 17, wherein the adhesive sheet is as defined in any one of items 1 to 10.

19. A process of making an electrically conductive adhesive sheet for joining structural elements, the process comprising impregnating Bucky paper with an adhesive resin.
20. The process according to item 19, wherein the impregnating step comprises soaking the Bucky paper into the adhesive resin, optionally under vacuum.
21. The process of item 19 or 20, wherein the Bucky paper is impregnated with the adhesive resin and with a curing agent.
22. The process of any one of items 19 to 21, wherein the adhesive resin is a thermoset resin, an epoxy resin or a polyurethane resin.
23. The process of any one of items 19 to 22, further comprising partially curing the adhesive resin.
24. The process of any one of items 19 to 23, further comprising forming the adhesive sheet into one or more strips.
25. The process of item 24, further comprising aligning the strips parallel to each other or into a checkered pattern or a diamond checkered pattern.
26. The process of any one of items 19 to 25, further comprising disposing the adhesive sheet onto a peel-away film.
27. The process of item 26, further comprising covering the adhesive sheet with another peel-away film.
28. The process of any one of items 19 to 27, further comprising cutting the adhesive sheet to a size covering about half of an overlap area between structural elements to be joined with the adhesive sheet.
29. The process of any one of items 19 to 28, further comprising forming the adhesive sheet into one or more strips, disposing the strips parallel to each other and orienting the strips generally normal to a load direction.
30. The process of any one of items 19 to 29, wherein the adhesive sheet is as defined in any one of items 1 to 10.

DETAILED DESCRIPTION OF THE INVENTION

Figure 1:
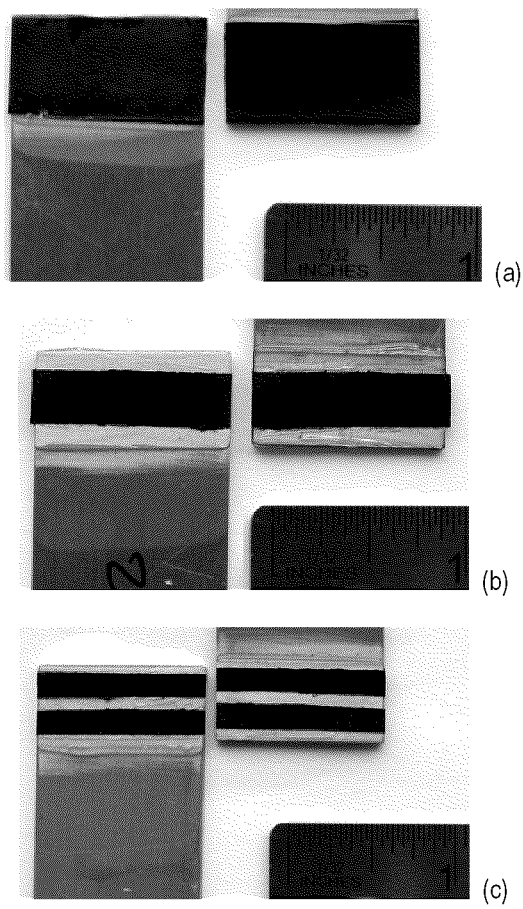
FIGS. 1a-c show photographs of fractured lap joints made with Bucky paper adhesive having different configurations.

According to an aspect of the present invention, there is provided a novel adhesive for joining structural elements. This adhesive is in the form of a sheet, is electrically conductive and comprises Bucky paper impregnated with an adhesive resin.

The structural elements to be joined by the adhesive (typically, but not exclusively two elements) are disposed on each side of the adhesive sheet. In other word, the adhesive sheet is inserted into an overlapping area between the elements. As such, it is understood that the adhesive sheet is generally adhesive on both sides.

In embodiments, the adhesive sheet has a shear strength of at least about half, at least about 60%, at least about 70%, at least about 80%, or at least about 90% of the shear strength of an adhesive made of the adhesive resin only. In embodiments, the adhesive sheet has a shear strength about the same as the shear strength of an adhesive made of the adhesive resin only.

The adhesive sheet is electrically conductive in the sense that it allows electricity to flow through it (in a direction more or less normal to the plane of the sheet) from one of the structural elements to the other. It should be understood that the adhesive sheet is also electrically conductive along the plane of the sheet. However, it is the ability to conduct electricity in a direction more or less normal to the plane of the sheet that normally allows electricity to travel from one of the structural elements to the other as desired.

In embodiments, the adhesive sheet has a resistance of at most about 100, 90, 80, 70, 60, 50, 45, 40, 35, 25, 15, 10, 5, or 3 Ω, In embodiments, the adhesive sheet has a resistance of about 2.3 Ω.

Bucky paper is made of carbon nanotubes, which may include multi-walled carbon nanotubes (MWCNT), single-walled carbon nanotubes (SWCNT) as well as combinations thereof. Bucky papers are thin sheets of paper-like material typically made by the filtration of a solution of carbon nanotubes. According to an aspect of the present invention, the nanotubes are dispersed in a low molecular weight liquid, preferably N,N-dimethylformamide. The nanotubes are then filtered through a membrane. The filtered nanotubes form a thin sheet structure similar to that of a regular paper sheet. The Bucky papers thus formed of SWCNTs can have a typical thickness of 50 microns and a conductivity of 1000 S/cm. Those formed of MWCNTs can have a typical thickness of 50 microns and a conductivity of 30 S/cm.

The Bucky paper is impregnated with any suitable adhesive resin. It is to be understood that since the purpose of the resin is to join and hold together the structural elements, it is able to bind these elements. For example, in the case of a resin for which binding is achieved through curing, the resin should not be totally cured on the Bucky paper before the adhesive sheet of the invention is used. It may, on the other hand, be partially cured. However, only when the adhesive sheet is placed between the structural elements to be joined, should such a resin be totally cured.

In embodiments, the Bucky paper is soaked in the adhesive resin under vacuum and/or heat (in embodiments, the temperature being between about 60° C. and 80° C.). A suitable adhesive is ideally of sufficiently low viscosity to allow easy impregnation and has a relatively long pot life so that it may thoroughly impregnate the Bucky paper. Combinations of suitable adhesives may also be used. In embodiments, thermoset resins are used for impregnation into the Bucky paper. Examples of suitable adhesive resins include, but are not limited to, epoxy resins and polyurethane resins as well as combinations thereof. Ultimately, the adhesive would be chosen according to the demands of the particular application in which the adhesive sheet is to be used.

When resin such as epoxy is impregnated into the Bucky paper, isotropic composites having conductivities higher than the in-plane conductivity of carbon fiber composites are formed at only 30 wt % nanotube content. As the Bucky paper (100% nanotubes) absorbs the resin, it swells. The maximum resulting nanotube content is typically of about 30 wt % to about 35 wt %. An example of epoxy resin is the commercially available Epon™ 862 resin.

The Bucky paper may also be impregnated with a curing agent, such as the commercially available Epikure™ W curing agent. The Bucky paper strips may be soaked in resin and in curing agent simultaneously. In fact, when a curing agent is necessary, the Bucky paper should be impregnated simultaneously with the curing agent and with the resin. In such cases, the curing agent and the resin may be mixed prior to impregnation thereof into the Bucky paper.

The adhesive sheet of the present invention may be used in many applications such as for metal and composite substrates that are conductive, for aircraft and spacecraft applications, automotive applications, wind mill applications, household applications and the like.

The adhesive of the present invention is useful for joining a wide range of structural elements. These include any metal or composite substrates that are conductive such as for example aluminum adherents, copper adherents and the like. Stainless steel and carbon fiber composite substrates may also be joined using the adhesive of the present invention. In order to join structural elements, the adhesive is placed in the overlap area between the structural elements which are then pressed together. When a thermoset resin is used, the structural elements are pressed together and the resin is then cured.

According to an aspect of the invention, the adhesive sheet may comprise a partially cured resin, i.e. not a completely cured resin.

The adhesive of the present invention may be produced in a form more or less similar to a band aid. In this embodiment, the adhesive sheet would be disposed on a peel-away film. Optionally, another peel-away would cover the other side of the adhesive sheet. Such peel-away films would ease handling of the adhesive sheets as well as their storage. This would also prevent them from unintentionally sticking to unintended substrates. For use, the peel-away film(s) would simply be peeled off the adhesive sheet, which would then be applied between the structural elements to be joined. When two peel-away films are used, it is desirable to peel only one of them, apply the thus uncovered side of the adhesive sheet to one of the structural elements to be joined, remove the second peel-away film and press the second structural element onto the side of the adhesive sheet thus uncovered.

In such case, one, for example a manufacturer, may be able to produce the adhesive sheet by a continuous process, and also avoid providing or selling the liquid form of the adhesive. Additionally, such automation would ensure better consistency of manufacturing quality.

The adhesive sheet may be cut as desired. In embodiments, the adhesive sheet may be cut into strips. In embodiments, the Bucky paper is cut into strips before impregnation. In other embodiments, the adhesive sheet (already impregnated Bucky paper) is cut into strips. Such handling would be eased by using peel-away films on both sides of the adhesive sheet. Thus, the shape and size of the adhesive sheet can be tailored by the manufacturer for a specific intended purpose. In addition, the shape and size can be modified by the end user, which allows using the adhesive sheet in a large variety of applications.

In embodiments, the strips may be arranged into a predetermined configuration. Again, this is especially eased when the adhesive sheet is manufactured on a peel-away film or between two peel-away films, which would hold the strips into place. In this embodiment, parameters such as lap joint coverage, strip widths, distance between the strips, orientation of the strips, etc. can be set prior to the use of the adhesive sheet, thus making it more user-friendly. Alternatively, the adhesive sheet strips may also be arranged by the end user according to his/her own need. In embodiments, the strips can be arranged parallel to each other or in a checkered pattern or diamond checkered pattern.

As illustrated in the examples below, the present inventors have found that the orientation and configuration of the adhesive sheet in the lap joint advantageously affects its resulting resistance and shear strength. Specifically, it was found that while covering the whole lap joint with the adhesive sheet imparts desirably low resistance; the resulting shear strength is somewhat low. It was also found that strips of the adhesive sheet oriented parallel to the load direction, as in FIG. 2b, imparted higher resistance and lower shear strength. On the other hand, strips of the adhesive sheet covering about half of the lap joint and oriented normal to the load direction as in FIG. 2c impart higher shear strength and lower resistance values.

Figure 3:
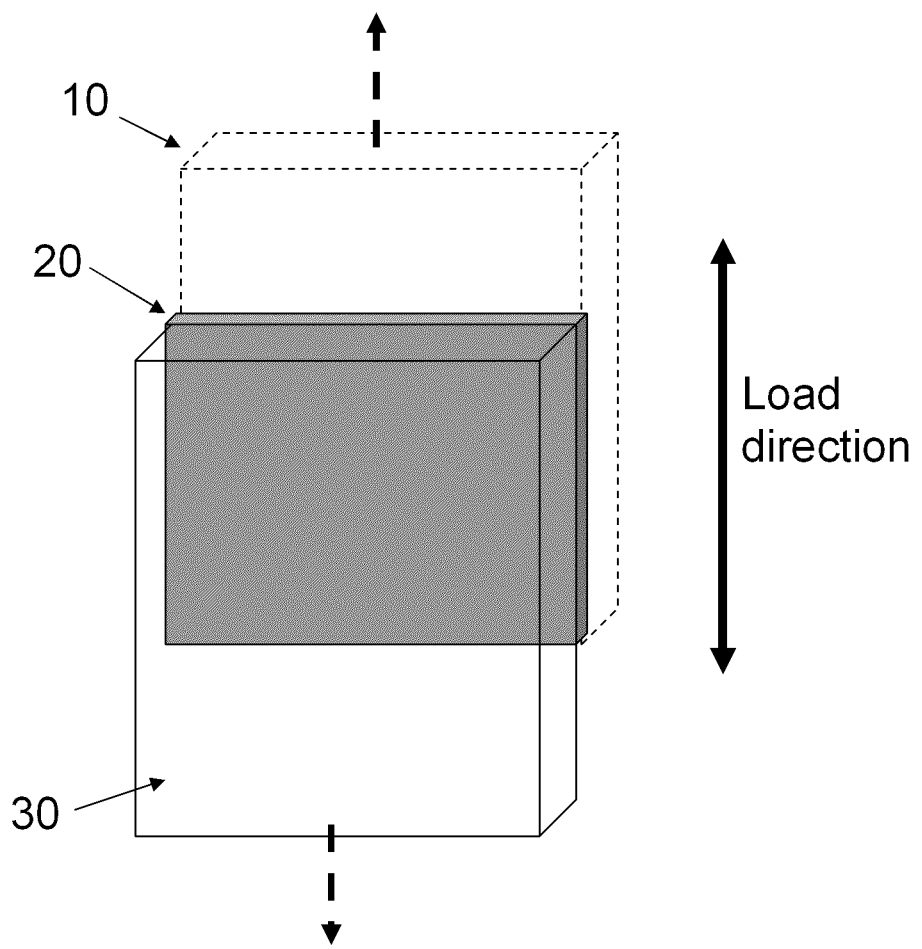
FIG. 3 is a schematic showing the load direction for a joint between two structural elements.

For further certainty, FIG. 3 shows the load direction for two structural elements joined by an adhesive, such as the adhesive sheet of the invention. In FIG. 3, 10 is a first structural element, 20 is the adhesive, and 30 is a second structural element. Presuming that one is pulling on structural elements 10 and 30 as indicated by the dashed arrows (both structural elements being effectively pulled apart), the load direction will be as indicated by the bidirectional arrow to the right of the figure.

Without being bound by theory, it is believed that orienting the adhesive sheet strips normal to the load direction is particularly advantageous because after examining the fractured lap joints, cracks normal to the load direction were observed. Therefore placing the adhesive sheet strips normal to the load direction reduces the crack growth. Thus, according to an aspect of the present invention, the adhesive sheet strips cover about half of the lap joint and are oriented generally normal to the load direction. However, for each specific application different configurations of adhesive Bucky strips may be used. Other configurations of the adhesive Bucky strips in the lap joint include for example a checkered, a diamond checkered configuration, a slanted configuration with respect to the load direction, etc.

It should be noted that when more than one adhesive sheet strip is used to join structural elements, such strips need not be identical in shape. Different widths and lengths of strips may be used in the same lap joint to provide the desired coverage thereof.

Based on the above, in embodiments, the adhesive sheet covers about only half of the lap joint.

As shown in the examples below, a lap joint made with the adhesive sheet according to an aspect of the invention had similar shear strength and was as much as $10^{11}$ more electrically conductive than a lap joint made with the original resin (without Bucky paper). Further, it was found that adhesive sheets made according to an aspect of the present invention did not add much weight when compared to the original Bucky paper. Indeed, the density of SWCNTs is of about 1.3 g/cm$^3$ and the density of MWCNTs is of about 1.8 g/cm$^3$. An epoxy resin usually has a density of about 1.1 g/cm$^3$. As such, adding the epoxy resin to the Bucky paper advantageously did not add much weight to the resulting adhesive sheet.

The adhesive of the present invention may be easily made and used. Conventionally, when two substrates are to be joined together using an adhesive, the adhesive is in the form of a viscous liquid. This viscous liquid must be spread over both surfaces of the substrates and the wetted substrates must then be pressed together. At this stage, the pressure must be carefully controlled. Indeed, if the applied pressure is too low, the bond will not be strong. On the other hand, if too much pressure is applied, the adhesive may run out of the joint which would result in a dry or spotty joint. To prevent this, it is commonplace in the art to insert one or more spacers in the lap joint. Such spacers are necessary not only with conventional adhesives containing carbon nanotubes dispersed in an adhesive resin, such as an epoxy resin, but also with adhesives containing resins only, without carbon nanotubes. The purpose of the spacer is to control the thickness of the adhesive. Normally, hollow glass spheres with diameters of about 0.2 mm or 0.3 mm are used as spacers. In contrast, the adhesive sheet according to an aspect of the present invention serves itself as a spacer and thus no additional spacer is necessary. Further, high pressure may be applied to the adhesive sheet according to an aspect of the present invention because the adhesive sheet can withstand high pressures without running out of the lap joint. The adhesive sheet of the present invention thus significantly facilitates the preparation of bonded joints. In addition, since the adhesive sheet can resist against such pressures, the automation of the joining process is eased. It is indeed difficult to automate this process for conventional adhesives as it is difficult to automate the spreading of liquid adhesives.

The present invention also eliminates the need for dispersing carbon nanotubes in resins as in more conventional adhesives. This is a valuable advantage since dispersing carbon nanotubes in resins has proven to be a difficult and a delicate process which usually yields adhesives having high viscosities. Such viscosities are due to the fact that carbon nanotubes have a high tendency to form ropes and bundles.

Further, as shown in the examples below, the adhesive sheet according to an aspect of the present invention not only imparts shear strengths similar to that of the neat resin (line 1 of Table 1 below) and the resins having carbon nanotubes dispersed therein (lines 6 and 7 of Table 1 below), but also imparts a resistance that is considerably lower than that of the resins having carbon nanotubes dispersed therein. Thus according to an aspect of the present invention, there is provided an adhesive for joining structural elements that yields joints of low electrical resistance and of high shear strength.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

Figure 2:
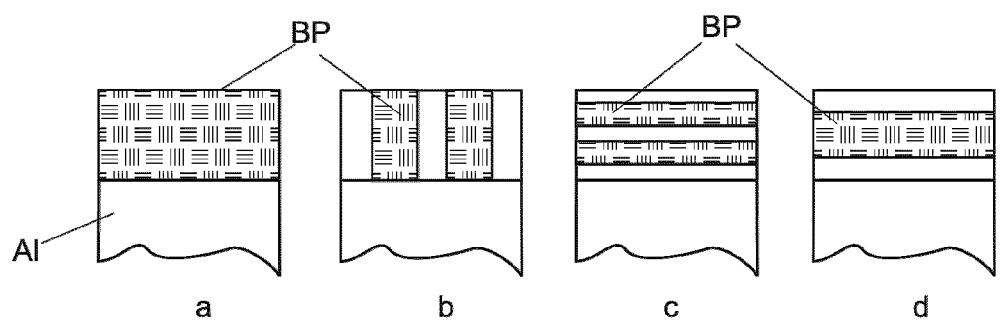
FIGS. 2a-d are schematic diagrams showing different placement configurations of Bucky paper adhesive at the lap joint,
  in FIG. 2a: the Bucky paper adhesive covers 100% of the overlap area,
  in FIG. 2b: two equal strips of Bucky paper adhesive, equally spaced, oriented parallel to the load direction, cover 50% of the overlap area,
  in FIG. 2c: two equal strips of Bucky paper adhesive, equally spaced, oriented normal to the load direction, cover 50% of the overlap area, and
  in FIG. 2d: one strip oriented normal to the load direction, covers 50% of the overlap area.

Lap joints with an overlap of 1×½" (25.4×12.7 mm) were produced as follows:

a. Bucky paper adhesive: Impregnated Bucky paper (BP) strips:
  Strips of 1"×½", 1"×¼" and 1"×⅛" were cut out from BP made from SWCNTs using the above described method;
  The strips were kept at 130° C. for 2 h to remove humidity;
  The strips were soaked in a mixture of epoxy resin (Epon™ 862) and curing agent (Epikure™ W) (26.4%) in a vacuum oven at 80° C. for 30 min to thoroughly impregnate the Bucky paper. It was found that at a temperature of 80° C., the viscosity of the resin and curing agent mixture was sufficiently low to allow a good impregnation of the Bucky paper; and
  The excess resin was eliminated by vacuum bagging at 80° C. for 10 min.

b. Surface preparation of the aluminum alloy Al 2024 adherents:
  The adherents were degreased with acetone;
  The overlap region (1" wide ×½" long) was lightly sanded with a 240 grit paper;
  The overlap region was treated with chromic acid for 10 min at 66° C.

c. Lap joint assembly:
  Both adherents were coated with a thin layer of adhesive and curing agent (Epon™ 862 and Epikure™ W, degassed at 80° C. for 15 min)
  The impregnated strips were placed as shown in FIGS. 1 and 2;
  The adherents were C-clamped and cured at 177° C. for 2.5 h.

The shear strengths of the lap joints were determined according to the ASTM D1002-01 on an MTS 100 kN machine at 1.3 mm/min strain rate. For each configuration, 10 specimens were tested. The minimum and maximum shear strengths were measured, the average values were calculated with 95% of confidence interval (see Table 1).

The resistance of the lap joints was measured using a current source Keithley 6220 and a nanovoltmeter Keithley 218A. The performance of the corresponding lap joints is presented in Table 1 below.

The test specimens displayed cohesive failure as shown in FIG. 1. The shear strength and electrical resistance of samples made using Bucky paper adhesive (lines 2, 3, 4 and 5 of Table 1) were compared to those made using adhesive consisting of the resin Epon™ 862 and curing agent Epikure™ W mixture (line 1 of Table 1) as well as to samples made by epoxy adhesive having dispersions containing 1 wt % and 2wt % of multi-walled carbon nanotubes (MWCNT) in the resin (lines 6 and 7 of Table 1). The latter covered the whole of the lap joints and were prepared by dispersing the nanotubes in the thermoset resin and a curing agent mixture (while adjusting shear forces during the dispersing). Of note, glass microspheres were used as a spacer in samples represented by lines 1, 6 and 7 of Table 1.

TABLE 1

Comparative properties of lap joints made with different adhesives

| No. | Description | Shear strength, MPa | Resistance, Ω |
|---|---|---|---|
| 1 | Resin and curing agent mixture | 21.26 ± 1.99 | $4.0 \times 10^{12}$ |
| 2 | BP as in FIG. 2a | 10.78 ± 1.02 | 2.3 |
| 3 | BP as in FIG. 2b | 15.95 ± 1.52 | 40.2 |
| 4 | BP as in FIG. 2c | 22.97 ± 2.47 | 37.1 |
| 5 | BP as in FIG. 2d | 22.25 ± 2.19 | 35.6 |
| 6 | 1 wt % of MWCNT dispersed in the resin | 22.22 ± 1.80 | 305.6 |
| 7 | 2 wt % of MWCNT dispersed in the resin | 22.61 ± 2.09 | 120.3 |

Several observations may be made from Table 1:

a. BP adhesive outperforms by one to two orders of magnitude the electrical resistance of that of the adhesive with epoxy resin containing dispersed CNTs.

b. In order to maintain the shear strength at least at the level of the neat resin, it is preferable that the BP does not cover completely the bonded area. The degree of the coverage could be viewed as a compromise between the electrical loads and shear strength.

c. The parallel orientation of the BP strips (FIG. 2b) results in lower shear strength than the normal orientation to the load (FIGS. 2c and d).

Although the present invention has been described hereinabove by way of specific embodiments thereof, it can be modified, without departing from the spirit and nature of the subject invention as defined in the appended claims.

REFERENCES

1. Wu. Z. et al, Study of processing variables on the electrical resistivity of conductive adhesives, International Journal of Adhesion & Adhesives 29 (2009) 488-494.
2. Z Wang et al., Processing and property investigation of single-walled carbon nantotubes (SWNT) buckypaper/epoxy resin matrix nanocomposites, Composites: Part A 35 (2004) 1225-1232.
3. P. Gonnet et al., Thermal conductivity of magnetically aligned carbon nanotube buckypapers and nanocomposites, Current Applied Physics 6 (2006) 119-122.
4. J. Baur and E. Silverman, Challenges and Opportunities for Nanotechnologi in Multifunctional Structures, Air Force Research Laboratory, November 2006.
5. T. Gibson et al. Formulation and Evaluation of Carbon Nanofiber-based Conductive Adhesives.
6. P. E. Lapes et al. High CNT content composites with CNT Buckypaper and epoxy resin matrix: Impregnation behaviour composite production and characterization, Composite Structures, 92 (2010) 1291-1298.
7. US 2008/0057265
8. US 2009/0280324
9. US 2010/0188833

All documents above are incorporated herein in their entirety by reference.

The invention claimed is:

1. A method of forming an electrically conductive joint between structural elements, the method comprising:
   a) providing one or more strips of an electrically conductive adhesive sheet comprising bucky paper impregnated with an adhesive resin,
   b) covering about half of an overlap area between the structural elements with the strip(s) of the conductive adhesive sheet, the strip(s) being aligned in a direction generally normal to a load direction, and
   c) pressing the structural elements together.

2. The method of claim 1, wherein the adhesive resin is a curable resin, wherein the adhesive resin is uncured or only partially cured during steps a) through c), and wherein the method further comprises the step d) of curing the adhesive resin to loin the structural elements together.

3. The method of claim 2, wherein the adhesive resin is an epoxy resin.

4. The method of claim 1, comprising in step a), the step of cutting the adhesive sheet into one or more strips.

5. The method of claim 4, wherein the strips are provided pre-aligned parallel to each other.

6. The method of claim 1, wherein one or more peel-away film are provided on the adhesive sheet and wherein the method further comprises removing the one or more peel-away film from the adhesive sheet prior to and/or after the covering step, but before the pressing step.

7. The method of claim 1, wherein the bucky paper is made of single-walled carbon nanotubes.

8. The method of claim 1, wherein the adhesive sheet further comprises a curing agent.

9. The method of claim 1, wherein the adhesive resin is a thermoset resin, an epoxy resin or a polyurethane resin.

* * * * *